United States Patent
Petrick et al.

(10) Patent No.: US 7,561,196 B2
(45) Date of Patent: Jul. 14, 2009

(54) METHOD AND APPARATUS FOR PREVENTING IMAGE ARTIFACTS

(75) Inventors: Scott William Petrick, Sussex, WI (US); Roland Frederick Saunders, Hartland, WI (US); Douglas I. Perry, Ottawa (CA)

(73) Assignee: General Electric Company, Schenectady, NY (US)

( * ) Notice: Subject to any disclaimer, the term of this patent is extended or adjusted under 35 U.S.C. 154(b) by 920 days.

(21) Appl. No.: 10/861,270

(22) Filed: Jun. 4, 2004

(65) Prior Publication Data

US 2004/0218077 A1    Nov. 4, 2004

Related U.S. Application Data

(63) Continuation of application No. 09/659,191, filed on Sep. 11, 2000, now Pat. No. 6,888,969.

(51) Int. Cl.
*H04N 3/14* (2006.01)
*H04N 5/335* (2006.01)

(52) U.S. Cl. .................. 348/297; 348/294

(58) Field of Classification Search .............. 348/230.1, 348/241, 297, 299, 301
See application file for complete search history.

(56) References Cited

U.S. PATENT DOCUMENTS

| | | | |
|---|---|---|---|
| 5,452,338 A | 9/1995 | Granfors et al. | |
| 5,604,347 A | 2/1997 | Petrick et al. | |
| 5,617,139 A * | 4/1997 | Okino | 348/223.1 |
| 5,657,400 A | 8/1997 | Granfors et al. | |
| 5,724,401 A | 3/1998 | Kurtz et al. | |
| 5,784,432 A | 7/1998 | Kurtz et al. | |
| 6,078,037 A * | 6/2000 | Booth, Jr. | 250/208.1 |

* cited by examiner

*Primary Examiner*—Tuan V Ho
*Assistant Examiner*—Chia-Wei A Chen
(74) *Attorney, Agent, or Firm*—McAndrews, Held & Malloy, Ltd.; Peter J. Vogel; Michael A. Dellapenna

(57) ABSTRACT

A pixel sensing subsystem for a solid state image sensor includes frame timing logic that produces a frame timing signal indicative of an end-of-frame time and a beginning-of-frame time and reset logic that produces a reset signal for a charge accumulator of pixel sensing electronics. The reset logic asserts the reset signal at least once between the end-of-frame time and the beginning-of-frame time to prevent saturation of the pixel sensing element.

14 Claims, 4 Drawing Sheets

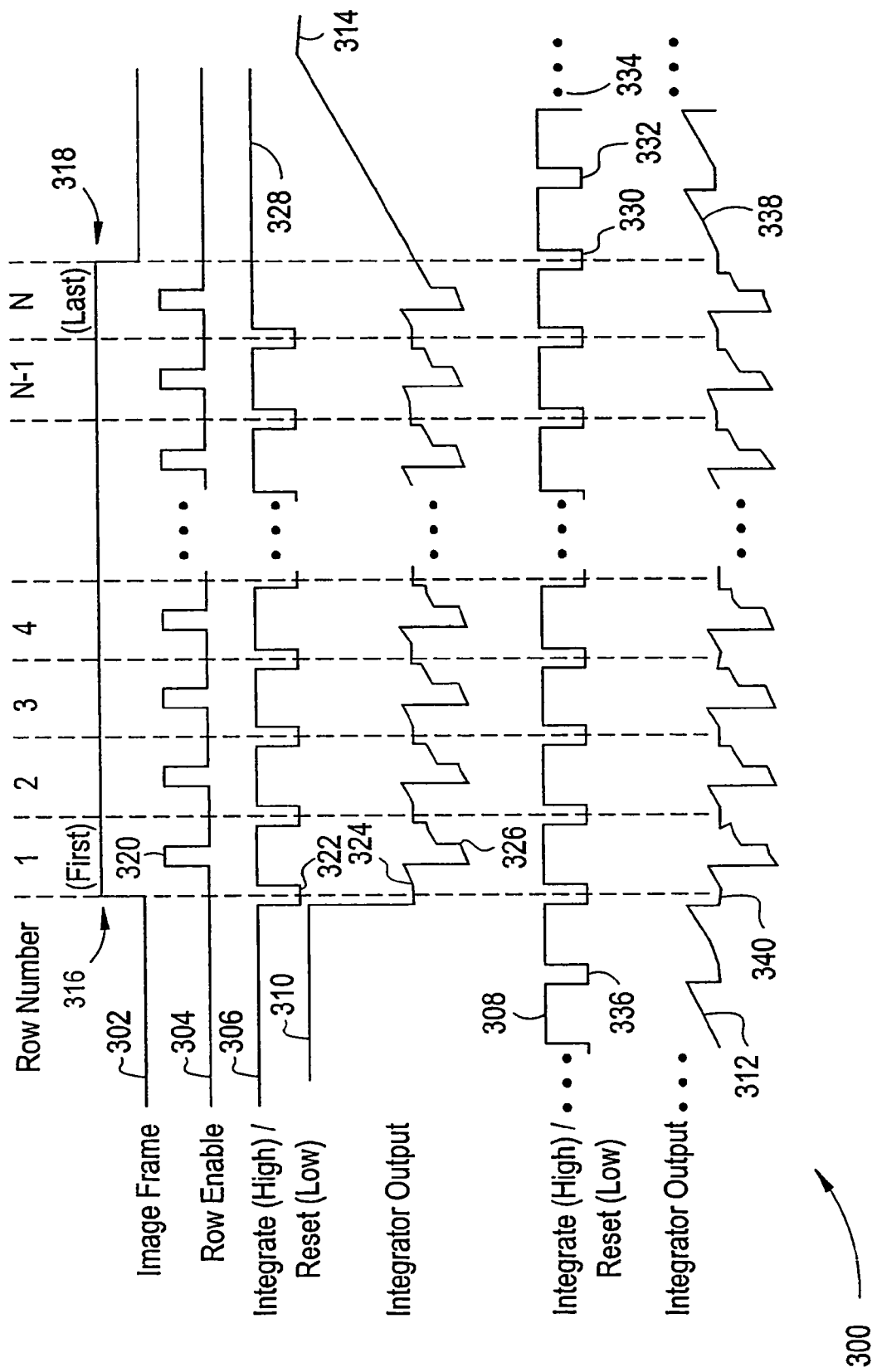

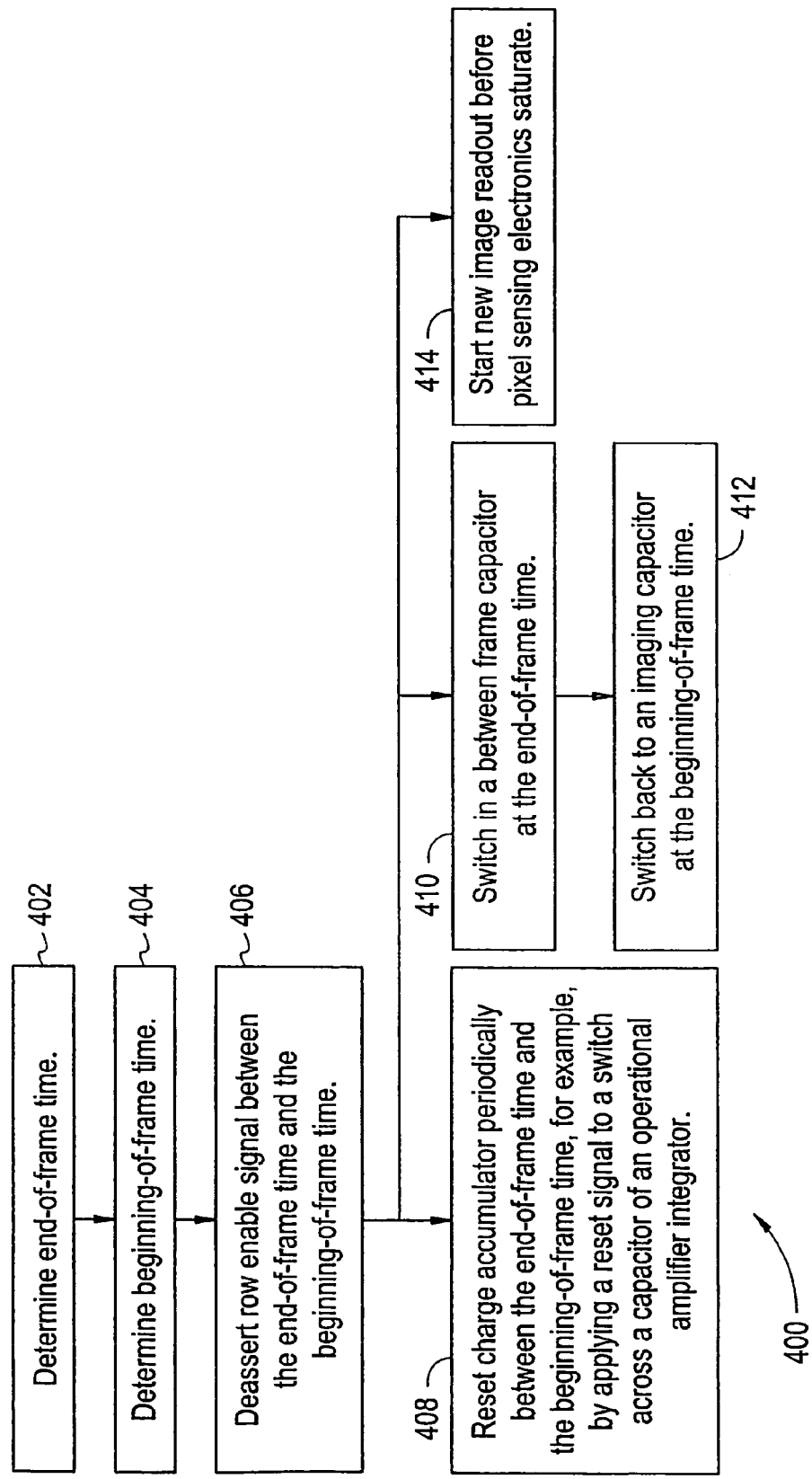

METHOD AND APPARATUS FOR PREVENTING IMAGE ARTIFACTS

RELATED APPLICATIONS

This application is a continuation of U.S. patent application Ser. No. 09/659,191, filed Sep. 11, 2000, now U.S. Pat. No. 6,888,969 entitled "Method and Apparatus for Preventing Image Artifacts".

FEDERALLY SPONSORED RESEARCH OR DEVELOPMENT

Not Applicable.

BACKGROUND OF THE INVENTION

The present invention relates to solid state image sensors. In particular, the present invention relates to prevention of image artifacts in solid state X-ray detectors such as those used in medical diagnostic equipment.

Present day solid state X-ray detectors are composed of an array of rows and columns of individual sensing elements ("pixels") typically formed from amorphous silicon diodes. Each pixel is connected to a sense line (shared by a column of pixels) through a switch typically implemented as a thin film transistor or diode. Each row of pixels (a scan line) shares a separate control line, which activates and deactivates the switches for all the pixels in the scan line.

Readout electronics read the array by enabling one scan line at a time using the scan line for that row. Sensing electronics connected to each sense line measure the signal on each of the sense lines to provide a value for each pixel in the scan line. After the readout electronics read a scan line, that scan line is deactivated and the next scan line is read. The readout electronics read each scan line in succession until all of the pixels of the array are read.

When a switch is activated, electric charge from both the pixel and the sensing electronics is drawn into the switch to establish a conductive channel in the switch. The charge is ideally completely pushed back out of the channel when the switch is deactivated. However, because the switch is made from amorphous silicon, a relatively large amount of charge remains in the channel ("the retained charge") and bleeds out slowly over time.

The retained charge affects the offset of a detector that has not been exposed to X-rays. An image that is read out from the array without first exposure to X-rays is called a "dark image". The dark image, because of the retained charge, is slightly negative (i.e., there is a negative offset). Furthermore, assuming that there is time allowed for exposure between two readouts of the array, the first scan line read will have considerably less retained charge adding to its signal than the last line read (which will have retained charge from potentially all of the scan lines).

The sense electronics must accumulate and measure small amounts of charge transferred from the pixel during the time that the switches are activated. Furthermore, in order to avoid interference with the signals from one scan line to the next, the charge accumulated and measured by the sense electronics must be reset to zero after deactivation of one scan line and before activation of the next scan line. An integrator (formed by an operational-amplifier and a capacitor in the feedback path of the operational-amplifier) is often used to implement the sensing electronics. A switch across the capacitor may then be used to short out the capacitor and return the accumulated charge to zero. The output voltage of the operational-amplifier is a measure of the amount of charge integrated during a predetermined integration period when the switch is open.

One of the two terminals of the pixel (e.g., the diode cathode) is connected through its switch and the data line to one of the inputs of the operational-amplifier. The anode of all the diodes are held at another common potential. The intent is to form a bias across the diode, that being the difference in potential between the common and the data line (amplifier input). If the data line potential varies from one reading to the next, then the sense electronics will generate a signal that does not correlate to the X-rays absorbed by the detector (i.e., an error signal). The operational-amplifier works to keep the data line at the same potential as its second or reference input by supplying charge from the operational-amplifier output through the capacitor. However, the operational-amplifier is limited by its power supply voltages. Thus, if the operational-amplifier saturates, and can no longer supply charge to the feed back capacitor, the data line potential will change, thereby changing the bias across the pixel. An error signal results.

While the operational-amplifier is saturated, the operational-amplifier temporarily loses control over its input and the data line potential. In other words, the operational-amplifier cannot immediately restore the desired potential to the data line. As a result, many subsequent pixel readouts in a column are corrupted by the error signal, resulting in "white streaks" in the image read from the array. The streaks persist until the data line is returned to the desired potential. In the past, operational-amplifier saturation was commonly caused by allowing the integrator to accumulate charge on the capacitor for the relatively lengthy period between frames.

A need has long existed for a method and apparatus for preventing image artifacts that addresses the problems noted above and others previously experienced.

BRIEF SUMMARY OF THE INVENTION

A preferred embodiment of the present invention provides a method for preventing image artifacts during image readout from a solid state image sensor. The method includes the steps of determining an end-of-frame time indicative of image readout completion, determining a beginning-of-frame time indicative of image readout initiation, and resetting a charge accumulator of the pixel sensing electronics at least once between the end-of-frame time and the beginning-of-frame time to prevent saturation of the pixel sensing electronics.

A further preferred embodiment of the present invention provides a pixel sensing subsystem for a solid state image sensor. The pixel sensing subsystem includes frame timing logic that produces a frame timing signal indicative of an end-of-frame time and a beginning-of-frame time and reset logic that produces a reset signal for a charge accumulator of the pixel sensing electronics. The reset logic asserts the reset signal at least once between the end-of-frame time and the beginning-of-frame time to prevent saturation of the pixel sensing electronics.

Another preferred embodiment of the present invention provides a solid state image sensor. The image sensor includes an array of pixels organized into rows and columns, a row enable line for each row of pixels, and a column sense line for each column of pixels. The image sensor further includes pixel sensing electronics coupled to each column sense line, row enable logic producing a row enable signal on the row enable lines and asserted during readout of a row of pixels coupled to a particular row enable line, and frame timing logic that produces a frame timing signal indicative of an end-of-frame time and a beginning-of-frame time. The solid state image sensor also includes reset logic that produces a reset signal coupled to individual charge accumulators of the pixel sensing electronics. The reset signal is asserted at least once between the end-of-frame time and the beginning-of-frame time to prevent saturation of the pixel sensing elements.

BRIEF DESCRIPTION OF SEVERAL VIEWS OF THE DRAWINGS

FIG. 3 depicts a signal timing diagram for the solid state image sensor.

FIG. 4 shows a flow diagram of operation of the solid state image sensor.

DETAILED DESCRIPTION OF THE INVENTION

Figure 1:
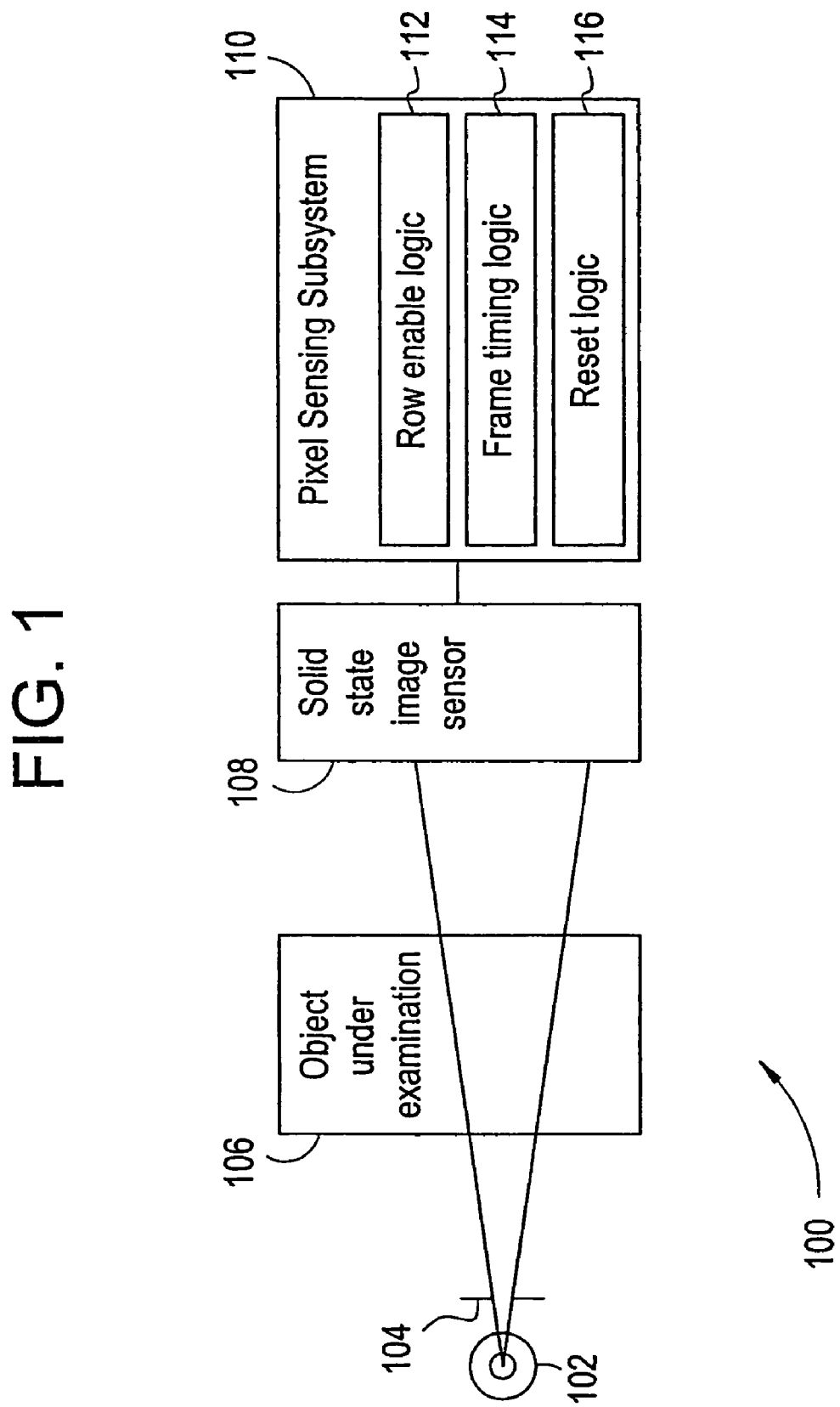
FIG. 1 shows a system level diagram of an X-ray imaging system including a solid state image sensor.

Turning now to FIG. 1, that figure illustrates a system level diagram of an X-ray imaging system 100. The imaging system 100 includes an X-ray source 102 and a collimator 104, which subject an object under examination 106 to X-ray photons. As examples, the X-ray source 102 may be an X-ray tube, and the object under examination 106 may be a human patient.

The X-ray imaging system 100 also includes a solid state image sensor 108 ("image sensor 108") coupled to a pixel sensing subsystem 110. The pixel sensing subsystem 110 includes row enable logic 112, frame timing logic 114, and reset logic 116. The pixel sensing subsystem (and the associated row enable logic 112, frame timing logic 114, and reset logic 116) may be implemented in a single Application Specific Integrated Circuit (ASIC), gate array, Erasable Programmable Logic Device (EPLD), or the like.

Figure 2:
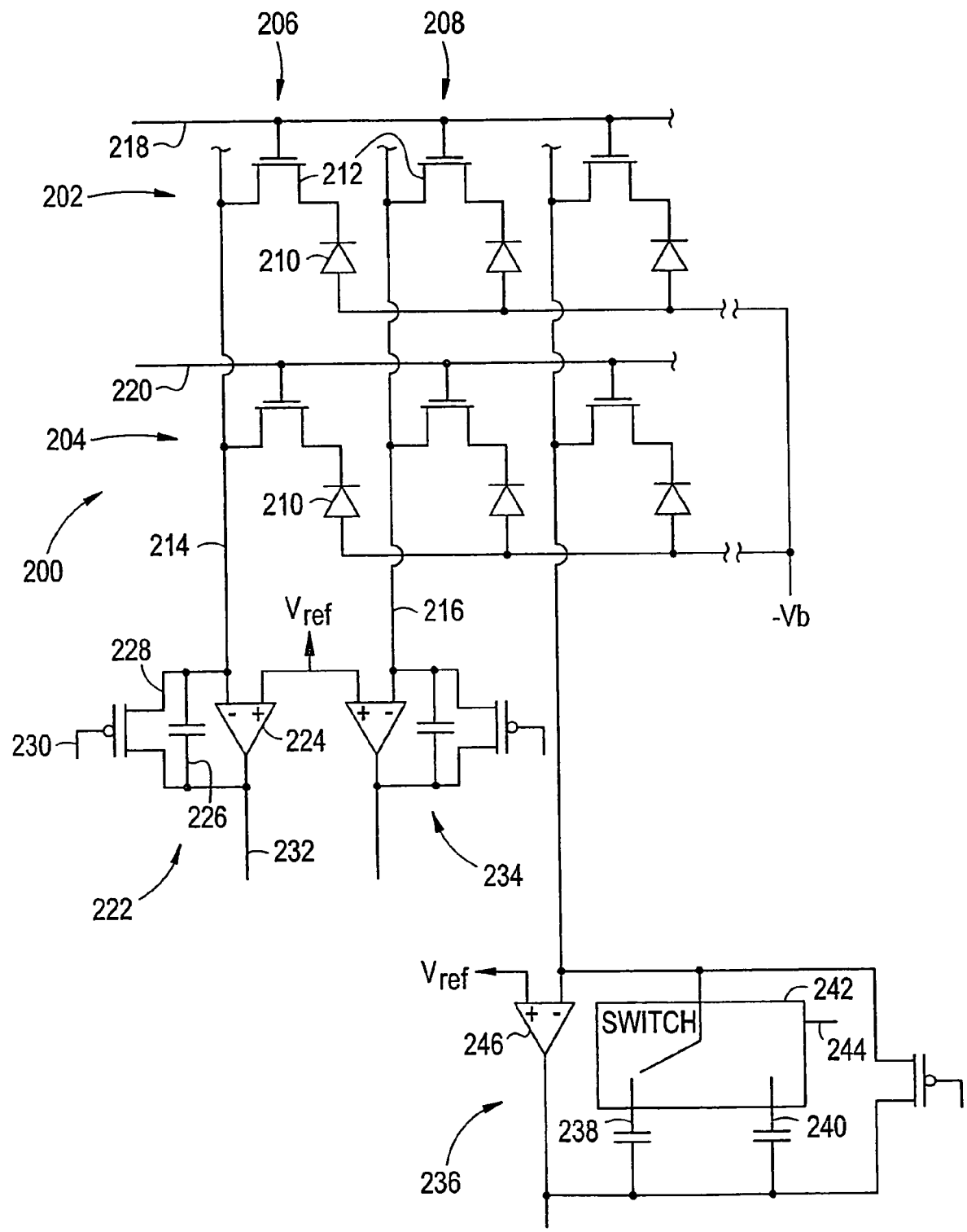
FIG. 2 illustrates a solid state image sensor.

Turning next to FIG. 2, that figure depicts an array of pixels 200 of the image sensor 108. In particular, the array of pixels 200 is organized into rows (e.g., rows 202 and 204) and columns (e.g., columns 206 and 208). The array of pixels 200 is formed from diodes (which operate as pixel sense elements) 210 coupled through row enable switches 212 to data lines (e.g., the data lines 214 and 216). The row enable switches 212 operate under control of row enable lines (e.g., the row enable lines 218 and 220).

Pixel sensing electronics are coupled to a data line of the array of pixels 200. FIG. 2 illustrates two identical sets of pixel sensing electronics 222 and 234. Pixel sensing electronics 222 are implemented as an operational amplifier integrator. In particular, an operational amplifier 224 includes a charge accumulator 226 (in this instance a feedback capacitor). The inverting input of the operational amplifier 224 is coupled to the data line 214, while the non-inverting input of the operational amplifier 224 is coupled to a voltage reference Vref.

In addition, a transistor switch 228 is disposed across the charge accumulator 226. Under control of a reset signal coupled to the reset input 230, the transistor switch 228 closes and dissipates the charge stored in the charge accumulator 226. The dissipation of charge in the charge accumulator 226 prevents the pixel sensing electronics 222 from saturating and thereby providing the wrong bias voltage on its inverting input. As noted above, the wrong bias voltage creates an error signal that may cause numerous pixels to be readout incorrectly, thereby resulting in streaks in the final image. The dissipation of charge also allows the accumulator to initialize between measurements of pixels in consecutive rows.

The pixel sensing electronics 222 integrate the charge stored in the pixels coupled to the data line 214. Thus, the sense output 232 (i.e., the integrator output) is indicative of the exposure of the pixels to X-ray photons (which reduces the charge initially stored in each pixel).

Turning now to FIG. 3, that figure illustrates a timing diagram 300 for the image sensor 108. In particular, FIG. 3 illustrates a frame timing signal 302, a composite row enable signal 304. Also illustrated are an unmodified reset signal 306, a modified reset signal 308, an unmodified integrator output 310, and a modified integrator output 312. As will be explained in more detail below, the modified reset signal 308 prevents the integrator output 310 from saturating (indicated in the unmodified integrator output 310 at reference label 314).

The frame timing logic 114 generates the frame timing signal 302, the row enable logic 112 generates the composite row enable signal 304, and the reset logic 116 generates the modified reset signal 308. The unmodified integrator output 310 is associated with operation under control of the unmodified reset signal 306. The modified integrator output 312 is associated with operation under control of the modified reset signal 308.

Note that the frame timing signal 302 delineates a beginning-of-frame time 316 (e.g., associated with a positive going edge of the frame timing signal 302) associated with image readout initiation. The frame timing signal 302 also delineates an end-of-frame time 318 (e.g., associated with a negative going edge of the frame timing signal 302) associated with image readout completion. In other words, the frame timing signal 302 is asserted, preferably, during readout of each of N rows of pixels in the array of pixels 200. Furthermore, in order to couple each row of pixels to the data lines, the row enable signal 304 is asserted (e.g., as noted by reference label 320) to close the associated row enable switches. Before each row is read, however, the charge accumulators are reset using the reset signal.

In particular, with regard to the unmodified reset signal 306, the unmodified reset signal 306 is asserted (e.g., as noted by reference label 322) to close, for example, the transistor switch 228, and remove the charge from the charge accumulator 226. The corresponding unmodified integrator output 310 is reset (as shown at reference label 324). The integrator output integrates the charge required to restore the bias to a pixel during the assertions of the row enable signal (e.g., assertion 320) to provide an output 326 indicative of the amount of pixel discharge during exposure to X-rays.

Note however that after each of the N rows has been read out, the unmodified reset signal 306 remains deasserted (e.g., as shown by reference label 328). As a result, the pixel sensing electronics continue to integrate retained charge in the row enable switches, and other charge retained in various parasitic capacitances. Thus, if too much time elapses before a new image is readout of the image sensor 108, then the pixel sensing electronics saturate (e.g., as indicated by reference label 314).

In reality, after saturation of any single set of pixel sensing electronics, a single assertion or a series of assertions for several pixels, of the reset signal (e.g., the assertion 322) may not be enough to restore the potential of the data line. Thus, the data line may remain at the wrong potential for a long time, and thereby inducing vertical streaks in the image readout of the image sensor 108. This is due to the impedance of the data line and the parasitic capacitance to it.

With regard now to the modified reset signal 308, however, note that the modified reset signal 308 continues to be periodically asserted even after all N rows of the image sensor 108 have been read out. For example, as shown in FIG. 3, the modified reset signal 308 is asserted periodically as shown by assertions 330, 332, 334, and 336 between the end-of-frame time 318 and the beginning-of-frame time 316. Thus, the corresponding modified integrator output 312 never reaches saturation. Instead, the modified integrator output 312, as shown at reference label 338, for example, remains within the constraints for operation of the operational amplifier integrator in its linear operating region and the data line potential is held constant. As a result, when a new image is readout of the image sensor 108, even the very first diode is restored to the correct bias and no error signal is generated due to an incorrect bias.

Turning next to FIG. 4, that figure shows an example flow diagram 400 of the operation of the pixel sensing subsystem 110. At step 402, the pixel sensing subsystem 110 determines an end-of-frame time 318. As one example, the pixel sensing subsystem 110 may use the negative going edge of the frame timing signal 302 for this purpose. Similarly, at step 404, the pixel sensing subsystem 110 determines the beginning-of-frame time 316, using, for example, the positive going edge of the frame timing signal 302.

Continuing at step 406, the pixel sensing subsystem 110 deasserts the row enable signal 304 between the end-of-frame time 318 and the beginning-of-frame time 316. Finally, at step 408, the pixel sensing subsystem 110 periodically resets a charge accumulator of the pixel sensing elements between the end-of-frame time 318 and the beginning-of-frame time 316 to prevent saturation of the pixel sensing electronics. As noted above, this may be accomplished by applying a reset signal to a transistor switch disposed across a capacitor of an operational amplifier integrator.

In an alternative approach to eliminating image artifacts, the pixel sensing subsystem 110 may instead employ a switched capacitor technique. Returning to FIG. 2, that figure also illustrates an alternate pixel sensing electronics 236. The alternate pixel sensing element 236 includes an image readout capacitor 238 and a between frame capacitor 240. A switch 242 operates under control of a switch control input 244 to couple one of the two capacitors 238, 240 to the operational amplifier 246.

The between frame capacitor 240 is generally larger in capacitance than the image readout capacitor 238. In operation, the switch control input 244 couples the image readout capacitor 238 to the operational amplifier 246 during image readout, and couples the between frame capacitor 240 to the operational amplifier 246 between frames (i.e., between the end-of-frame time 318 and the beginning-of-frame time 316). As a result, the larger between frame capacitor 240 allows the pixel sensing electronics 236 to accumulate charge for the period of time between the end-of-frame time 318 and the beginning-of-frame time 316 without saturating. When image readout begins, the switch control input switches the image readout capacitor 238 back into the circuit.

Returning to FIG. 4, the switched capacitor technique is indicated as optional steps 410 and 412. In particular, at step 410, the pixel sensing subsystem 110 switches in the between frame capacitor at the end-of-frame time 318. Similarly, at step 412, the pixel sensing subsystem 110 switches in the imaging capacitor at the beginning-of-frame time 316.

In yet another embodiment, the pixel sensing subsystem 110 may read out the image sensor 108 continuously, thereby never allowing the pixel sensing electronics to saturate. An image processing back end may then be used to discard dark images, and process only "live" images corresponding to an actual exposure. In this embodiment, the reset signal need not be modified. Thus, referring again to FIG. 4, the pixel sensing subsystem 100 may optionally initiate another readout of the image sensor 108 before any of the pixel sensing electronics saturate or frequently enough to end saturation and completely restore the data line to the correct potential before the next live image readout.

The present invention thereby provides a method and apparatus for preventing image artifacts. The method and apparatus may be used in conjunction with solid state image sensors such as those found in X-ray imaging systems. Image artifacts, including streaks in the readout image are prevented, thereby increasing the diagnostic utility of any image obtained from the solid state image sensor.

While the invention has been described with reference to a preferred embodiment, it will be understood by those skilled in the art that various changes may be made and equivalents may be substituted without departing from the scope of the invention. In addition, many modifications may be made to adapt a particular situation or material to the teachings of the invention without departing from its scope. It is therefore intended that the invention not be limited to the particular embodiment disclosed, but that the invention include all embodiments falling within the scope of the appended claims.

What is claimed is:

1. A method for preventing image artifacts during image readout from a solid state image sensor, the method including:
   indicating an end-of-frame time associated with image readout completion;
   indicating a beginning-of-frame time associated with image readout initiation; and
   switching a coupling between an image readout capacitor and a pixel sensing element to a coupling between said pixel sensing element and a between frame capacitor after said end-of-frame time but before said beginning-of-frame time, wherein a first charge accumulated within the image readout capacitor dissipates when said switching closes the coupling between the image readout capacitor and the pixel sensing element, and wherein a second charge accumulated within the between frame capacitor dissipates when said switching closes the coupling between the between frame capacitor and the pixel sensing element.

2. The method of claim 1, further including:
   switching said coupling between said pixel sensing element and said between frame capacitor to said coupling between said image readout capacitor and said pixel sensing element after said beginning-of-frame time.

3. The method of claim 1, wherein said indicating step occurs by a frame timing logic producing a frame timing signal.

4. The method of claim 1, further including producing an output signal indicative of an amount of pixel discharge.

5. The method of claim 4, wherein said output signal is produced by said pixel sensing element.

6. The method of claim 1, wherein said between frame capacitor has a larger capacitance than said imaging capacitor.

7. The method of claim 1, wherein said pixel sensing element includes an operational amplifier.

8. A system for preventing image artifacts during image readout from a solid state image sensor, the system including:
   a frame timing signal indicating an end-of-frame time associated with image readout completion and a beginning-of-frame time associated with image readout initiation;

a between frame capacitor accumulating charge after said end-of-frame time but before said beginning-of-frame time to prevent pixel sensing electronics from saturating; and a switch coupling said between frame capacitor to a pixel sensing element after said end-of-frame time, wherein the charge accumulated in said between frame capacitor dissipates when said switch closes.

9. The system of claim 8, further including an image readout capacitor accumulating charge during image readout, wherein said switch couples said pixel sensing element and said image readout capacitor after said beginning-of-frame time.

10. The system of claim 8, further including a frame timing logic producing said frame timing signal.

11. The system of claim 8, further including an output signal indicative of an amount of pixel discharge.

12. The system of claim 11, wherein said output signal is produced by said pixel sensing element.

13. The system of claim 8, wherein said between frame capacitor has a larger capacitance than said image readout capacitor.

14. The system of claim 8, wherein said pixel sensing element includes an operational amplifier.

* * * * *